United States Patent
Nakayama et al.

(10) Patent No.: US 11,618,163 B2
(45) Date of Patent: Apr. 4, 2023

(54) INDUSTRIAL ROBOT SYSTEM

(71) Applicant: FANUC CORPORATION, Yamanashi (JP)

(72) Inventors: Kazutaka Nakayama, Yamanashi (JP); Takahiro Iwatake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 186 days.

(21) Appl. No.: 16/702,865

(22) Filed: Dec. 4, 2019

(65) Prior Publication Data

US 2020/0206919 A1 Jul. 2, 2020

(30) Foreign Application Priority Data

Dec. 27, 2018 (JP) .............................. JP2018-245014
Jun. 28, 2019 (JP) .............................. JP2019-121733

(51) Int. Cl.
*B25J 9/16* (2006.01)

(52) U.S. Cl.
CPC .............. *B25J 9/1633* (2013.01); *B25J 9/163* (2013.01); *B25J 9/1674* (2013.01); *B25J 9/1694* (2013.01)

(58) Field of Classification Search
CPC ........ B25J 9/1633; B25J 9/163; B25J 9/1674; B25J 9/1694; B25J 9/1679; B25J 9/1602; B25J 13/085; B25J 9/1692; G05B 2219/39058; G05B 2219/40599; G05B 2219/39529; G05B 2219/37008;

(Continued)

(56) References Cited

U.S. PATENT DOCUMENTS

| | | |
|---|---|---|
| 2002/0011092 A1 | 1/2002 | Hara et al. |
| 2013/0211739 A1 | 8/2013 | Nitz et al. |

(Continued)

FOREIGN PATENT DOCUMENTS

| | | |
|---|---|---|
| CN | 108656112 A | 10/2018 |
| EP | 0937974 A2 | 8/1999 |

(Continued)

OTHER PUBLICATIONS

Japanese Office Action dated May 18, 2021, in connection with corresponding JP Application No. 2019-121733 (11 pp., including machine-generated English translation).

(Continued)

*Primary Examiner* — Abby Y Lin
*Assistant Examiner* — Esvinder Singh
(74) *Attorney, Agent, or Firm* — Maier & Maier, PLLC

(57) ABSTRACT

An industrial robot system includes: a robot that includes a torque sensor on at least one rotary shaft; and a controller that controls the robot. The controller includes a moment output unit that outputs a value of moment from a posture of the robot or the posture and a motion of the robot, a program storage unit that stores a motion program, a drive control unit that causes each of component parts of the robot to perform a rotating motion around the rotary shaft in accordance with the motion program, and an output calibration unit that associates a torque detection value detected by the torque sensor with the value of moment output from the moment output unit in the rotating motion of each of the component parts around the rotary shaft performed by the drive control unit.

10 Claims, 5 Drawing Sheets

(58) Field of Classification Search
CPC ........ G05B 2219/39026; G05B 19/234; G05B 19/295; G05B 19/355; G05B 2219/37344; G05B 2219/40342; G05B 2219/41213; G05B 2219/39001; G05B 11/32; G05B 2219/40318; G05B 2219/42063; G05B 2219/49291; G05B 2219/34188; G05B 2219/37624; G05B 2219/42311; G01L 25/003; G01L 5/0066; G01L 3/02; A61B 2090/066; A61B 2090/031
See application file for complete search history.

(56) References Cited

U.S. PATENT DOCUMENTS

| | | |
|---|---|---|
| 2015/0250547 A1 | 9/2015 | Fukushima et al. |
| 2015/0313679 A1 | 11/2015 | Fukushima et al. |
| 2017/0015004 A1* | 1/2017 | Osaka .................... B25J 9/1641 |
| 2017/0079729 A1 | 3/2017 | Fukushima et al. |
| 2017/0259431 A1* | 9/2017 | Takeuchi ............... B25J 9/1633 |
| 2017/0266811 A1* | 9/2017 | Ogawara ................ B25J 9/1633 |
| 2017/0285625 A1 | 10/2017 | Sato et al. |
| 2018/0017452 A1* | 1/2018 | Okada .................... G01L 3/1457 |
| 2018/0181083 A1 | 6/2018 | Kosaka |
| 2018/0207813 A1* | 7/2018 | Lin ........................ B25J 13/085 |
| 2019/0091861 A1* | 3/2019 | Kasai ..................... B25J 13/085 |
| 2019/0350661 A1 | 11/2019 | Fukushima et al. |
| 2020/0043304 A1* | 2/2020 | Wakuda .................... H02P 6/24 |
| 2020/0171673 A1* | 6/2020 | Moosman ............. G01M 1/122 |
| 2020/0189118 A1* | 6/2020 | Hayaishi .................... B25J 9/08 |

FOREIGN PATENT DOCUMENTS

| | | |
|---|---|---|
| EP | 3 037 222 A1 | 6/2016 |
| JP | H11237296 A | 8/1999 |
| JP | 3053606 B | 6/2000 |
| JP | 2000-225592 A | 8/2000 |
| JP | 2009-220184 A | 10/2009 |
| JP | 2012218104 A | 11/2012 |
| JP | 2017177293 A | 10/2017 |
| JP | 2018057934 A | 4/2018 |
| JP | 2018106446 A | 7/2018 |

OTHER PUBLICATIONS

Japanese Search Report dated Mar. 18, 2021, in connection with corresponding JP Application No. 2019-121733 (19 pp., including machine-generated English translation).

* cited by examiner

INDUSTRIAL ROBOT SYSTEM

CROSS-REFERENCE TO RELATED APPLICATIONS

This application is based on Japanese Patent Applications Nos. 2018-245014 and 2019-121733, the contents of which are incorporated herein by reference.

FIELD

The present disclosure relates to an industrial robot system.

BACKGROUND

There is known an industrial robot, such as a cooperative robot, equipped with a torque sensor on at least one shaft to detect interference with people around the robot (e.g., see Japanese Unexamined Patent Application, Publication No. 2009-220184).

Generally, a torque sensor, having been calibrated as a single unit by measurement of a detection value in a state where a torque is not applied or at the time when a predetermined torque acts, is incorporated into an industrial robot and used so that the accuracy of the torque sensor is maintained.

SUMMARY

An aspect of the present disclosure is directed to an industrial robot system including: a robot that includes a torque sensor on at least one rotary shaft; and a controller that controls the robot. The controller includes a moment output unit that outputs a value of moment from a posture of the robot or the posture and a motion of the robot, a program storage unit that stores a motion program, a drive control unit that causes each of component parts of the robot to perform a rotating motion around the rotary shaft in accordance with the motion program stored in the program storage unit, and an output calibration unit that associates a torque detection value detected by the torque sensor with the value of moment output from the moment output unit in the rotating motion of each of the component parts around the rotary shaft performed by the drive control unit.

DETAILED DESCRIPTION

An industrial robot system 1 according to an embodiment of the present disclosure will be described below with reference to the drawings.

Figure 1:
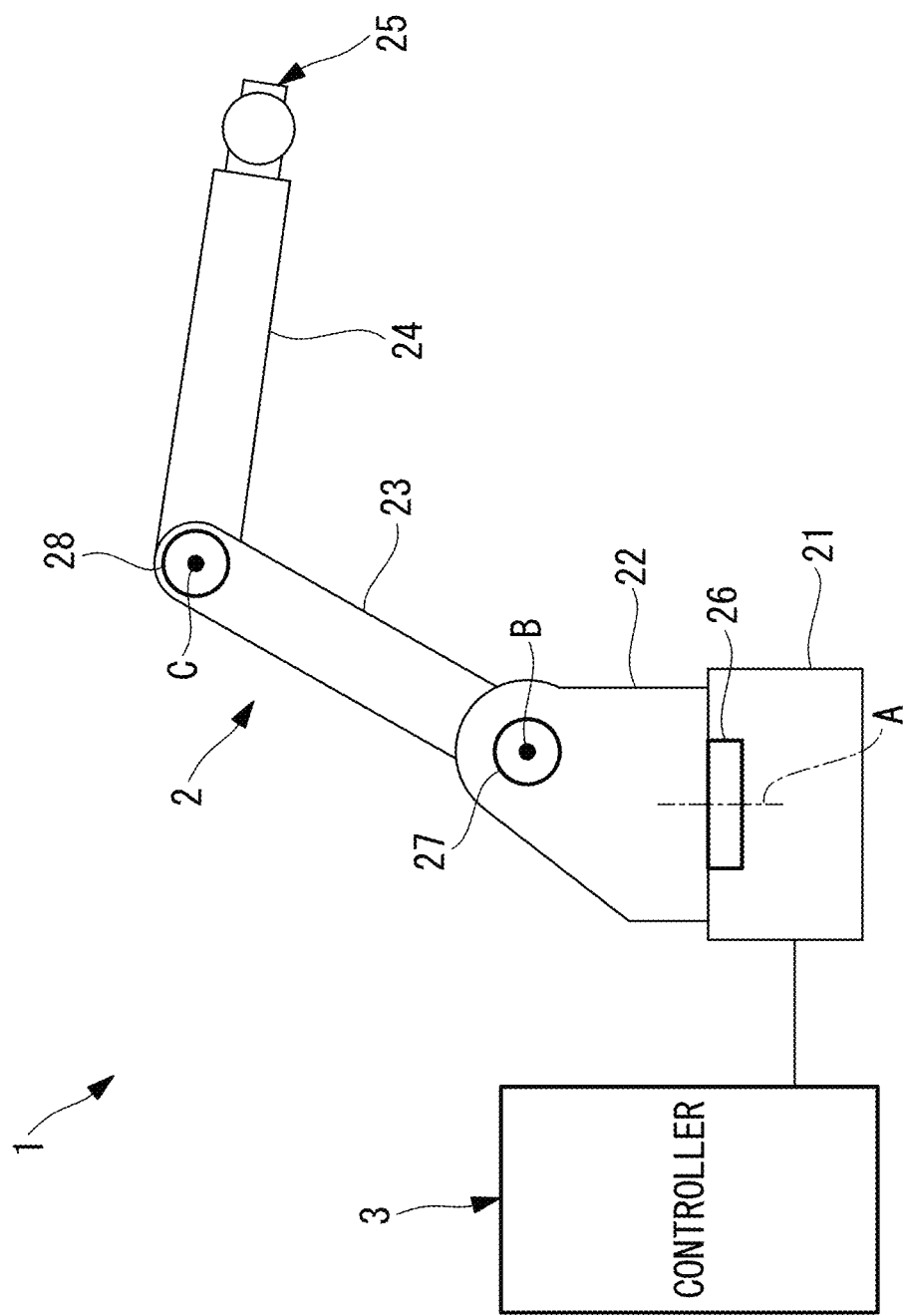
FIG. 1 is an overall configuration view showing an industrial robot system according to an embodiment of the present disclosure.

As shown in FIG. 1, the industrial robot system 1 according to the present embodiment includes a robot 2 and a controller 3 that controls the robot 2.

The robot 2 is, for example, a vertical articulated type robot. The type of the robot 2 is not limited, but any other form of the robot 2 may be employed.

The robot 2 includes: a base 21 installed on the floor surface (installation surface); a turning cylinder (component part) 22 supported rotatably around a vertical first axis (rotary shaft) A with respect to the base 21; a first arm (component part) 23 supported rotatably around a horizontal second axis (rotary shaft) B with respect to the turning cylinder 22; a second arm (component part) 24 having a longitudinal shaft supported rotatably around a horizontal third axis (rotary shaft) C with respect to the first arm 23; and a wrist unit (component part) 25 supported at the tip of the second arm 24.

The torque sensors 26, 27, 28 for detecting torques around the first axis A, the second axis B, and the third axis C are disposed respectively between the base 21 and the turning cylinder 22, between the turning cylinder 22 and the first arm 23, and between the first arm 23 and the second arm 24.

Figure 2:
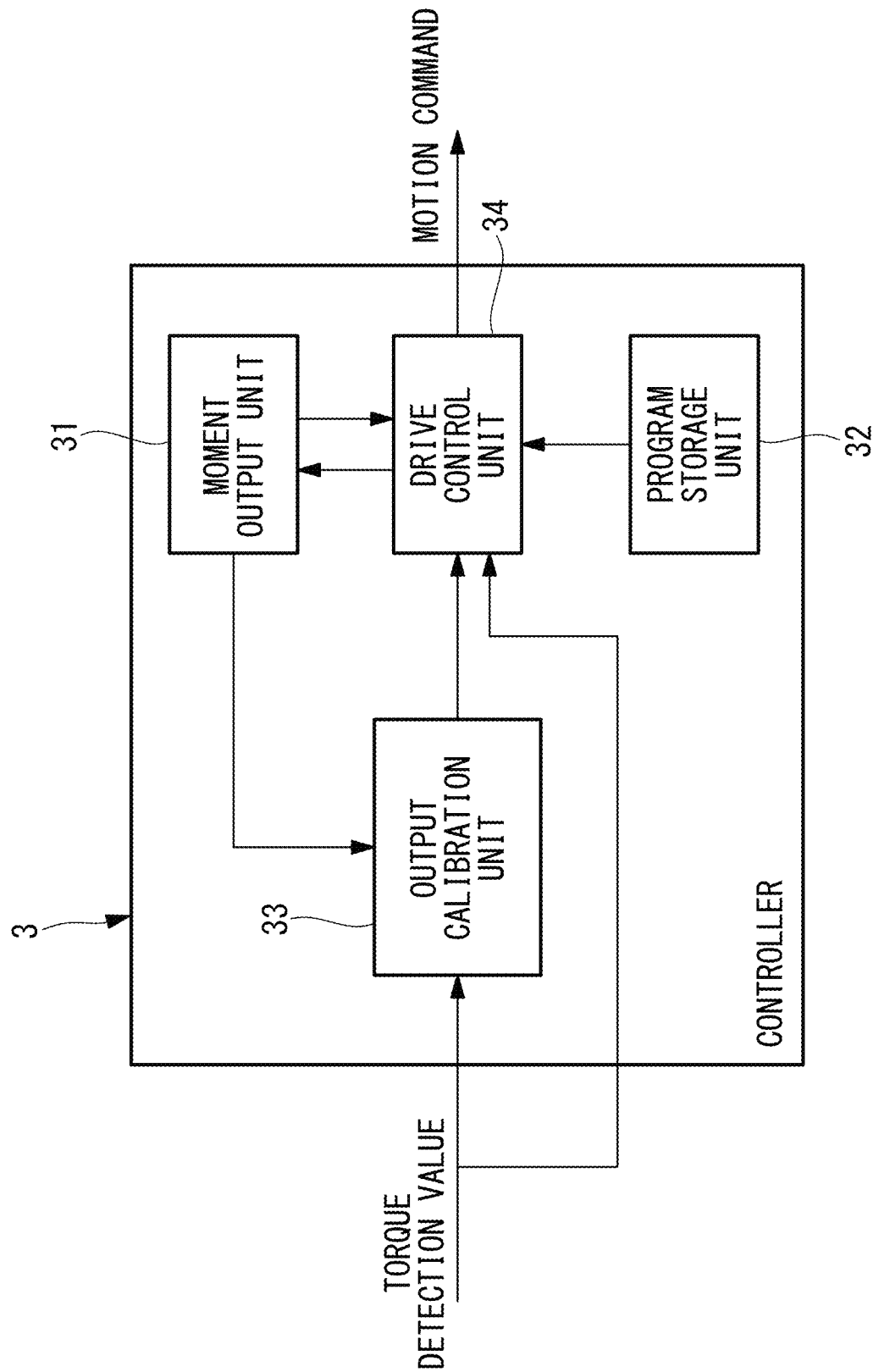
FIG. 2 is a block diagram showing a controller provided in the industrial robot system of FIG. 1.

As shown in FIG. 2, the controller 3 includes a moment output unit 31, a program storage unit 32, an output calibration unit 33 for the torque sensors 26, 27, 28, and a drive control unit 34. The controller 3 is made up of a memory and a processor.

The moment output unit 31 is a processing unit for outputting a value of moment from the posture of the robot 2 or the posture and motion of the robot 2. Specifically, the moment output unit 31 calculates a value of moment generated due to the mass, gravity, and inertial force of each of the component parts connected to the torque sensors 26, 27, 28, from the posture of the robot 2 or the posture and motion of the robot 2.

The moment output unit 31 may output the value of moment from the posture of the robot 2 and the rotation angle of each of the component parts around the rotary shafts A, B, C provided with the torque sensors 26, 27, 28, based on the association of the value of moment with the posture of the robot 2 and the rotation angle of each of the component parts around the rotary shafts A, B, C provided with the torque sensors 26, 27, 28. Further, the moment output unit 31 may calculate a value of moment acted by each of the component parts with the mass and weight thereof, the component parts being connected to the torque sensors 26, 27, 28, in accordance with the posture of the robot 2 and may output the value of moment. When the robot 2 moves and decelerates, for example, when the robot 2 moves to a predetermined position while accelerating and decelerating, the moment output unit 31 may calculate an inertial force caused by the mass of each of the component parts acting on the torque sensors 26, 27, 28 and outputs the inertial force.

More specifically, the moment output unit 31 is a storage unit for outputting the value of moment from the posture of the robot 2 or the posture and motion of the robot 2 and is formed of a memory. The moment output unit 31 may store data associating the value of moment with the posture of the robot 2 and the rotation angle of each of the component parts around the rotary shafts A, B, C provided with the torque sensors 26, 27, 28 and output the value of moment based on the association data. Further, the moment output unit 31 may temporarily (indirectly) store the value of moment calculated from the posture of the robot 2 and the motion of the robot 2, and the moment output unit 31 may output the stored value of moment.

In a case where the data associating the value of moment with the rotation angle of each of the component parts around the rotary shafts A, B, C provided with the torque sensors 26,27,28 is stored in the moment output unit 31, the rotation angle of the first arm 23 around the second axis B is associated with the value of moment acted around the second axis B by the component parts, including the first arm 23, the second arm 24, and the wrist unit 25, with the masses thereof, and the rotation angle of the second arm 24 around the third axis C is associated with the value of moment acted around the third axis C by the component parts including the second arm 24 and the wrist unit 25, and the associations are stored. This is equivalent to, as a specific example, making a table, a correlation graph, or a correlating approximation equation. Here, the value of moment is a moment not caused by an external force but acted on each of the torque sensors 26, 27, 28 by a mechanical portion of the robot 2 which includes the component parts, an attached tool, and the like, of the robot 2.

Since the masses and dimensions of each of the component parts including the first arm 23, the second arm 24, and the wrist unit 25 are known, the value of moment around the second axis B in accordance with the rotation angle of the first arm 23 around the second axis B can be calculated correctly. Data of the pre-calculated value of moments may be stored directly, or stored indirectly, into the moment output unit 31.

In a case where the value of moment is stored indirectly, it is sufficient that the mass, dimensions, or center of gravity of each of the component parts, including the first arm 23, the second arm 24, and the wrist unit 25, for calculation of the value of moment are stored in advance, and the value of moment is calculated by calculation using the rotation angle. In a case where the value of moment is calculated from the posture of the robot 2 and the information of each of the component parts and the attached part of the robot 2, a value of moment acting with the gravity, or the gravity and the movement of the robot 2, is calculated.

Here, the value of moment acting on each of the torque sensors 26, 27, 28 varies depending on the posture of the robot 2 and the angles including not only the rotation angle of each of the first axis A, the second axis B, and the third axis C which are the rotary shaft provided with the torque sensors 26, 27, 28, but also the angle of the tipped shaft thereof, and hence at the time of associating the rotation angle with the value of moment, the tipped shaft is presumed to be postured at a predetermined angle. At the time of setting a plurality of values as predetermined angles, it is desirable to store the data thereof in advance.

The program storage unit 32 is formed of a memory and stores a motion program.

Figure 3:
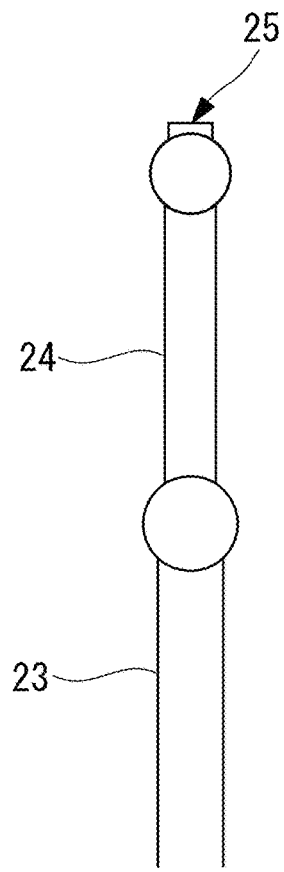
FIG. 3 is a diagram showing an origin position in a calibration motion of a torque sensor that detects a torque around a third axis according to the industrial robot system of FIG. 1.
Figure 4:
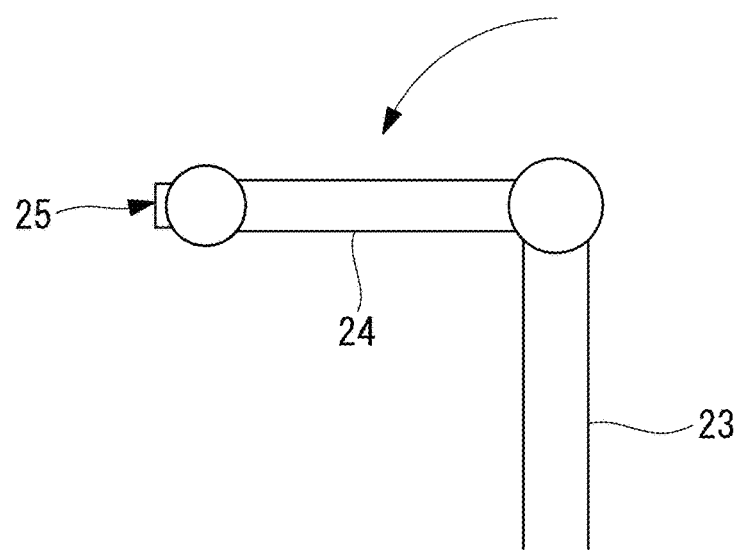
FIG. 4 is a diagram showing a state in which a second arm has been rotated in one direction in the calibration motion of FIG. 3.
Figure 5:
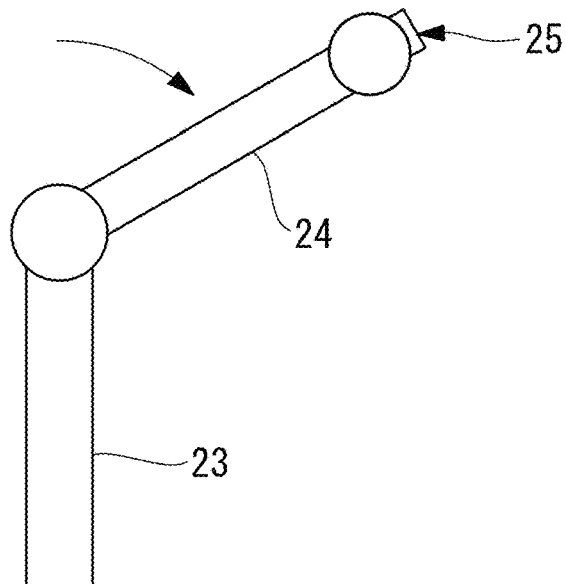
FIG. 5 is a diagram showing a state in which the second arm has been rotated in the other direction in the calibration motion of FIG. 3.

Examples of the motion program include a motion program taught in advance in order to cause the robot 2 to conduct work and a calibration program to obtain information for calibrating the torque sensors 26, 27, 28. For example, a calibration program for the torque sensor 28 that detects the torque around the third axis C is, for example as shown in FIGS. 3 to 5, a program for rotating only the second arm 24 around the third axis C in one direction with respect to the first arm 23, stopping the second arm 24 at a plurality of rotation angles in the middle of the rotation, and storing a torque detection value output from the torque sensor 28 at that time.

Figure 6:
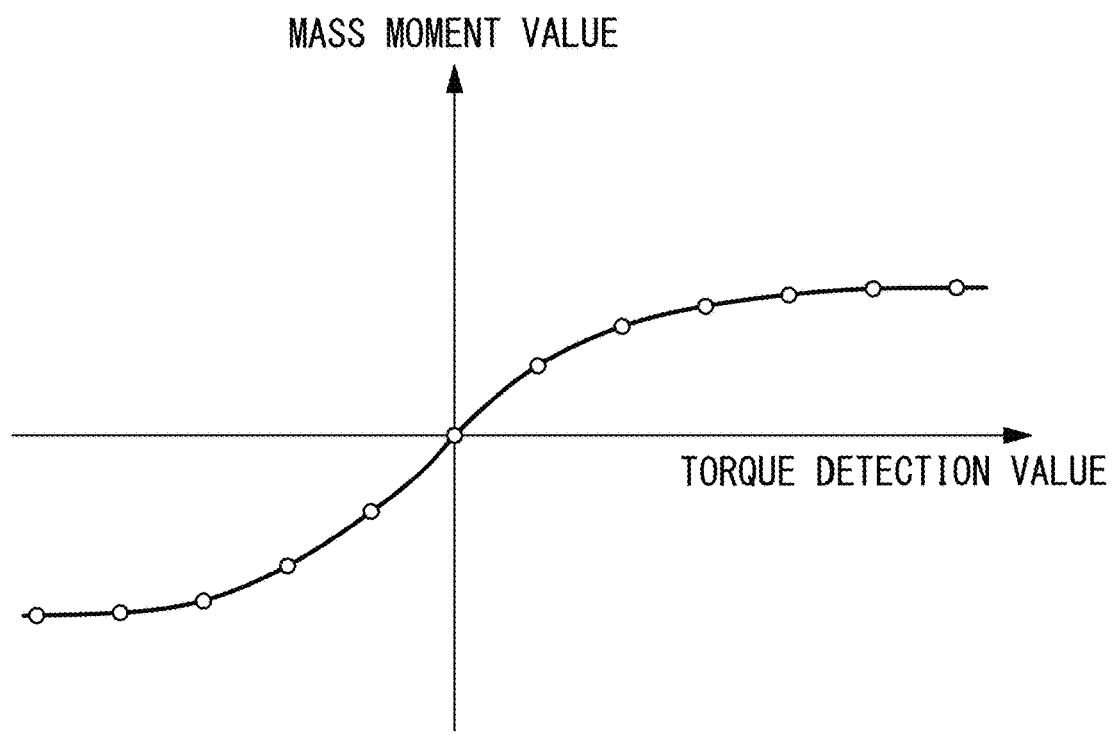
FIG. 6 is a diagram showing an example of an output characteristic of the torque sensor, obtained by the calibration motion of FIGS. 3 to 5.

The output calibration unit 33 is formed of a processor and, during the execution of the calibration program, the output calibration unit 33 associates the torque detection value detected by each of the torque sensors 26, 27, 28 at each rotation angle with the moment output by the moment output unit 31 to generate the output characteristic of each of the torque sensors 26, 27, 28 as shown in FIG. 6. The output characteristic of the torque sensor 27 for detecting the torque around the second axis B is generated in the same manner as the output characteristic of the torque sensor 28 for detecting the torque around the third axis C is generated.

On the other hand, the torque sensor 26 for detecting the torque around the first axis A executes a calibration program different from those for the torque sensors 27, 28 when it is assumed that the robot 2 is installed on a horizontal floor surface. The torque sensor 26 is calibrated using the mass and center of gravity of the mechanical portion, based on the output of the value of moment during the turning motion around the first axis A. When it is assumed that the robot 2 is installed on the horizontal floor surface, the moment due to the gravity acts on each of the shafts of the second axis B, the third axis C, and the wrist unit 25, excluding the first axis A which is a vertical rotary shaft or the first axis A which can take the posture of the vertical rotary shaft, so that the calibration can be performed in the stoppage state at a predetermined rotation angle.

However, since no moment due to the gravity acts on the first axis A, in order to calibrate the first axis A, it is necessary to change the posture of the robot 2 around the first axis A and calibrate all moments to be "0" in the state of the first axis A being stopped, and it is necessary to calibrate all value of moments to be constant values while the posture of the robot 2 around the first axis A is changed using a moment due to an inertial force acted by moving the first arm 23 of the robot 2 at a constant speed. The calibration may be performed so that the value of moment during the turning motion around the first axis A at a constant speed is "0."

The robot 2 may be accelerated or decelerated, for example, decelerated and stopped at a certain position, so that the value of moment acting on the torque sensor 26 changes, and the calibration may be performed using the value of moment with the inertial force acting on the torque sensor 26 at that time.

In this case, when the robot 2 moves by acceleration and deceleration from the posture and motion of the robot 2, the moment output unit 31 calculates an inertial force caused by the mass of each of the component parts acting on the torque sensor 26 and outputs the inertial force.

It is the calibration program for the torque sensor 26, which detects the torque around the first axis A, that stores the torque detection value output from the torque sensor 26 during the calibration as described above.

Here, when the torque sensors 27, 28 are structured to be offset, after the calibration of the torque sensors 27, 28, the calibration is performed using the torque sensors 27, 28 based on the torque detection value detected by pressing a constant force or moment in the robot 2, or different value of moments are preferably calibrated at several kinds of speeds. This can improve the accuracy in the generated output characteristic.

When the robot 2 is installed on a stand inclined with respect to the gravity direction, it is possible to calibrate the torque around the first axis A by utilizing the value of moment acting on each of the torque sensors 27, 28 with the gravity, and hence with the robot 2 installed in that manner, the torque sensor 26 may be calibrated.

The generated output characteristics are output to and stored into the drive control unit 34. The drive control unit 34 is made up of a processor and a memory.

At the time or executing the previously taught motion program, when the torque detection values detected by the torque sensors 26, 27, 28 are input, the torque detection values modified by the output calibration unit 33 using the stored output characteristics are calculated.

The drive control unit 34 determines whether or not the modified torque detection value exceeds a predetermined threshold, while generating a command signal in accordance with the motion program read from the program storage unit 32 and outputting the command signal to the robot 2. When the value exceeds the predetermined threshold, the drive control unit 34 outputs a command signal so that the robot 2 performs a specified motion, such as stopping, decelerating, escaping by being moved in the direction in which the force has acted, returning to the direction of the previous motion, or executing a previously prepared motion program.

Hereinafter, the action of the industrial robot system 1 according to the present embodiment configured as above will be described.

In a state where the industrial robot system 1 according to the present embodiment is installed in a factory or the like, the calibration program stored in the program storage unit 32 is executed by the operation of the controller 3.

In the calibration program, for example, while the second arm 24 is rotated around the third axis C with respect to the first arm 23, the second arm 24 is stopped at a plurality of rotation angles, and the torque detection value output from the torque sensor 28 in that state is read into the output calibration unit 33.

The value of moment stored in the moment output unit 31 is input into the output calibration unit 33 in association with the rotation angle of the second arm 24 output from the drive control unit 34. Thereby, the output calibration unit 33 generates the output characteristic associating the torque detection value and the value of moment which have been input. Similarly, the output characteristic is generated for the torque sensor 27 that detects the torque around the second axis B of the first arm 23 with respect to the turning cylinder 22. The generated output characteristic of each of the torque sensors 26, 27, 28 is transmitted to the drive control unit 34 and stored thereinto. This completes the calibration work.

When the previously taught motion program is read out of the program storage unit 32 and the robot 2 is operated by the drive control unit 34, the torque detection values detected by the torque sensors 26, 27, 28 are input directly into the drive control unit 34, and the modified torque detection values are calculated based on the stored output characteristics. Then, it is determined whether or not a moment or a force due to the action of an external force, calculated from the calculated torque detection value, exceeds a predetermined threshold, and when the moment or force exceeds the predetermined value, it is determined that a peripheral object has come into contact with the robot 2, and the robot 2 is stopped, decelerated, returned to the direction of the previous motion, or escaped by being moved in the direction in which the force has acted, or the previously prepared motion program is executed.

As thus described, in the industrial robot system 1 according to the present embodiment, the torque value detected by each of the torque sensors 26, 27, 28 at each of a plurality of rotation angles is associated with the value of moment stored in the moment output unit 31 (the value of moment output by the output unit 31) in the output calibration unit 33, so that it is possible to generate an accurately calibrated output characteristic, that is, the relationship of the value of moment with respect to the torque value detected by each of the torque sensors 26, 27, 28. Hence there is an advantage that, even if distortion occurs in the torque sensor 26, 27, 28 during the assembly of the torque sensors 26, 27, 28 into the robot 2, or even if the torque sensor 26, 27, 28 has a strong nonlinear characteristic, by only executing the program for calibration on the controller 3 of the robot 2, the torque sensors 26, 27, 28 can be calibrated with simplicity and high accuracy by the automatic operation of the robot 2 itself in a short time.

In the present embodiment, the case has been illustrated where the calibration is performed in the state where the mechanical portion of the robot 2 does not include the attached component part, such as the tool, to be mounted therein, but when the dimensions, weight, and center of gravity of the attached component part are known, the value of moment in the state of the attached component parts being mounted may be stored in advance in the moment output unit 31.

Thereby, there is an advantage that even in an environment where a different tool is mounted for each user and the tool cannot be removed, it is possible to recalibrate the torque sensors 26, 27, 28.

Further, based on the posture of the robot 2 and values of the mass and center of gravity of the component part attached to the robot 2, a value of moment being acted on each of the torque sensors 26, 27, 28 by the mechanical portion of the robot 2 may be calculated, and a net force acting on each of the torque sensors 26, 27, 28 may be calculated.

The rotation angle for detecting the torque set in the calibration program may be changed by a user in a freely selectable manner. It is possible to easily calibrate the torque sensors 26, 27, 28 also in an environment where the motion range of the robot 2 is limited.

Further, in the present embodiment, the case has been illustrated where the drive control unit 34 performs the contact determination for the robot 2 based on the moment or force by the action of the external force calculated from the value of moment associated by the output calibration unit 33 with the detected torque detection value, but the present disclosure is not limited to this. Instead of this, for example, there may be employed one in which, based on the moment or force by the action of the external force calculated from the value of moment associated by the output calibration unit 33 with the detected torque detection value, at the time of performing an inductive operation on the component parts of the robot 2 by directly holding the component parts, the drive control unit 34 controls an assist torque to generate a motion command for the robot 2 so as to reduce a force acted by an operator on the robot 2. It is thereby possible to lighten a lead-through operation.

Figure 7:
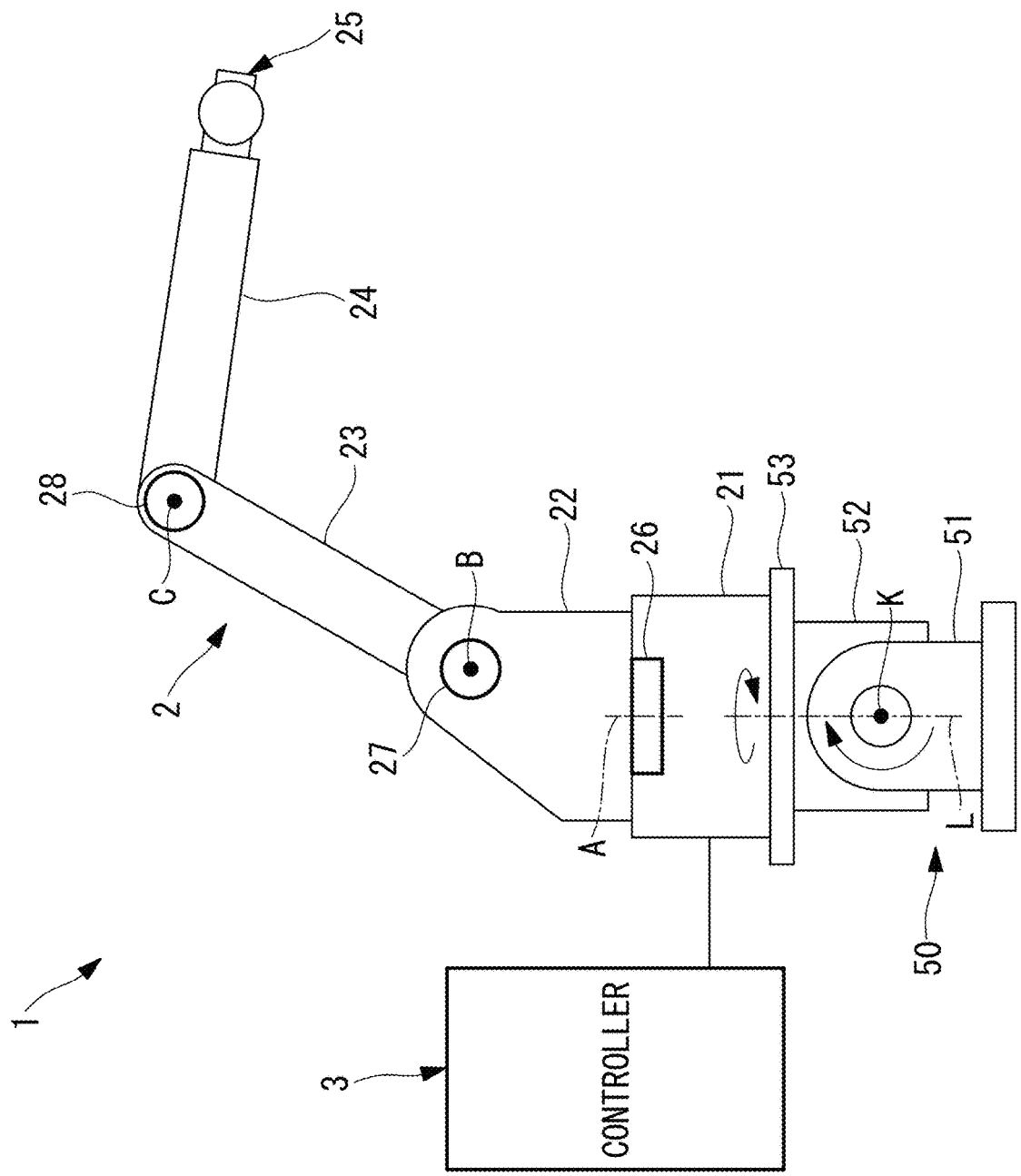
FIG. 7 is an overall configuration view showing a modification of the industrial robot system of FIG. 1.

As the industrial robot system 1 according to the present embodiment, the system in which the base 21 of the robot 2 is installed on the floor has been illustrated, but instead of this, as shown in FIG. 7, a system may be employed including a two-axis positioner 50 which is installed on the floor surface and on the upper surface of which the base 21 of the robot 2 is installed.

In this case, the two-axis positioner 50 includes a base portion 51 installed on the floor surface, a swinging portion 52 swingably supported around a horizontal swinging axis K with respect to the base portion 51, and a turning portion 53 rotatable around a turning axis L perpendicular to the swinging axis K with respect to the swinging portion 52. The base 21 of the robot 2 is installed on the upper surface of the turning portion 53. The installation place for the base portion 51 is not limited to the floor surface but may be a lateral wall surface, a downward wall surface, or the like, which may only be an installable contacted surface. In the present invention, the same applies to the other contacted surfaces.

Then, in a state where the robot 2 is installed on the turning portion 53 of the two-axis positioner 50, the swinging portion 52 is swung (rotated) around the swinging axis K to incline the robot 2 with respect to the floor surface. Thereby, the torque around the first axis A can be calibrated using the mass and center of gravity of the mechanical portion. Further, by controlling the two-axis positioner 50 with an additional shaft, the calibration can be performed automatically in a short time.

Alternatively, a one-axis positioner may be employed instead of the two-axis positioner 50, the one-axis positioner including a base portion 51 installed on the floor surface and a swinging portion 52 which is swingably supported around the horizontal swinging axis K with respect to the base portion 51 and on the upper surface of which the base 21 of the robot 2 can be installed.

In the present embodiment, the illustration has been made using the one in which each of the torque sensors 26, 27, 28 has a single system for outputting one torque detection value, but instead of this, there may be employed one in which each of the torque sensors 26, 27, 28 has torque detection units of two or more systems for detecting the torque acting on each of the torque sensors 26, 27, 28. Each of the torque detection units detects a torque acting on each of the torque sensors 26, 27, 28 and outputs the torque as a torque detection value.

In a plurality of torque sensors 26, 27, 28 provided in the robot 2, the number of torque detection units provided in each of the torque sensors 26, 27, 28 may be changed for each of the torque sensors 26, 27, 28. Hence the number of torque detection units can be changed depending on the installation point for each of the torque sensors 26, 27, 28.

When each of the torque sensors 26, 27, 28 has torque detection units of two or more systems, a single or a plurality of torque detection values may be associated with the output value of the moment output unit 31, and a torque value having been calibrated, modified, and corrected may be calculated by the output calibration unit 33.

The output calibration unit 33 associates the torque detection value of the torque detection unit of each system with the output value of the moment output unit 31 and outputs a torque value having been calibrated, modified, and corrected from the torque detection value. Moreover, the output calibration unit 33 may associate the torque detection values of the torque detection units of a plurality of systems, in other words, a plurality of torque detection values, with the output values of the moment output unit 31 and output a torque value having been calibrated, modified, and corrected from the torque detection values.

By preparing at least two detection systems for each of the torque sensors 26, 27, 28, at least two or more torque values are calculated and compared. When the difference between those values is greater than a threshold, it is determined that a failure has occurs in the torque sensor 26, 27, 28, and even when the torque detection value of one system cannot be detected due to some influence such as a failure, the torque detection value of the other system is used, thereby enabling quick and stable stoppage of the robot 2.

By using a plurality of output values of the torque detection unit in each of the torque sensors 26, 27, 28 to acquire the torque value from the output calibration unit 33, it is possible to calculate a torque value with more accuracy in each of the torque sensors 26, 27, 28.

The torque detection units of at least two systems are provided for each one of the torque sensors 26, 27, 28, but there is a possibility that the difference occurs in the detected torque detection value due to the unbalance of the torques with respect to the torque detection units of at least two systems, or the like, caused by distortion of the torque sensors 26, 27, 28 during the mounting thereof or the posture of the robot 2. In contrast, in each system, by associating the torque detection value detected by each torque detection unit with the value of moment output by the moment output unit 31, the difference in the output value of the torque detection value between each system is absorbed, the difference being due to such reasons as follows: the influence of the other-shaft interference generated by a force in the direction except for the direction of the torque acted on each of the torque sensors 26, 27, 28 owning to a cantilevered forearm support structure or the like; the unevenness of the stress distribution, distortion at the time of assembly of the torque sensors 26, 27, 28; and the individual difference between detection elements constituting each system. Then, the torque actually acting on each of the torque sensors 26, 27, 28 can be accurately calculated for each of two or more systems, to calculate two or more values of torque from one each of the torque sensors 26, 27, 28. Furthermore, even when the degree of influence of the other-shaft interference changes with a change in the shaft angle (arm posture) of the shaft except for the corresponding shaft, by associating the torque detection value with the output value of the moment output unit 31 while changing the shaft angle of the other shaft which has an influence of the other-shaft interference on the corresponding shaft, it is possible to calibrate the torque sensors 26, 27, 28 more accurately in consideration of the other-shaft interference.

As a method for detecting each of the torque sensors 26, 27, 28, as in the case of a force sensor, there is used a method for detecting displacement and strain, a method for detecting a change in characteristic, or some other method. A physical quantity to be detected at that time is a resistance value, current, capacitance, charged amount, inductance, light quantity, image, ultrasonic waves, magnetism, or the like.

Each of the torque sensors 26, 27, 28 may include one or more detection units that detect the physical quantity related to the torque. The physical quantity detected by the detection unit in each of the torque sensors 26, 27, 28 is any physical quantity so long as being changed by a torque or a force acted, such as a shift of a structure being detected as a change in electrical resistance, capacitance, electrification amount, or magnetism.

In the present embodiment, as each of the torque sensors 26, 27, 28, a sensor for detecting the torque acting on each of the torque sensors 26, 27, 28 may be employed, and a force sensor for detecting a force and moment, a torque sensor for detecting the torque acting around each of the rotary shafts A, B, C, or a torque sensor for detecting the torque acting around each of the rotary shafts A, B, C and the other shaft may be used.

Each of the torque sensors 26, 27, 28 may be configured to be able to detect the torque by incorporating the detection unit of each of the torque sensors 26, 27, 28 into a reducer, motor, gear, bearing portion, arms 23, 24, or the like, provided in the rotary-shaft structure constituting the robot 2.

Further, each of the torque sensors 26, 27, 28 may be configured to detect the torque by estimating the torque from the current value of the motor, or estimating the torque from the command position and the current position of the motor. As thus described, each of the torque sensors 26, 27, 28 may be formed into any configuration so long as being able to detect the torque based on the output value of the detection unit.

The torque detection value detected by each of the torque sensors 26, 27, 28 may be a value converted into a torque or a value obtained by converting a physical quantity into analog data or digital data.

In the detection of the torque by each of the torque sensors 26, 27, 28, the output calibration unit 33 may associate the output of the moment output unit 31 with the output of the detection unit in each of the torque sensors 26, 27, 28 which detects the value converted into the torque or the physical quantity related to the torque, and the output calibration unit 33 may detect an exact torque acting on each of the torque sensors 26, 27, 28 from the output of the detection unit in each of the torque sensors 26, 27, 28.

An arithmetic unit for performing calculation to calculate the torque from the physical quantity related to the torque may be provided on a printed circuit board, and housed inside the robot 2 together with the detection unit in each of the torque sensors 26, 27, 28.

Further, the arithmetic unit may be provided in the controller 3 of the robot 2, the output value of the detection unit in each of the torque sensors 26, 27, 28 may be transferred in a wired or wireless manner to the controller 3 that controls the robot 2, and the torque may be calculated in the controller 3 of the robot 2.

The arithmetic unit may be provided in a controller different from the controller 3 that controls the robot 2. The output value of the detection unit in each of the torque sensors 26, 27, 28 may be transferred in a wired or wireless manner to the controller different from the controller 3 that controls the robot 2, and the torque may be calculated in the different controller. As thus described, in the torque sensors 26, 27, 28, the arithmetic units may be disposed in the same positions as the detection units of the torque sensors 26, 27, 28, or the arithmetic units may be achieved by the controller 3 convenient for the industrial robot system 1 according to the present embodiment.

In this manner, as each of the torque sensors 26, 27, 28 for calculating the torques acting on the rotary shafts A, B, C, there may be employed a sensor including the detection unit that detects the physical quantity related to the torque and the arithmetic unit that calculates the torque based on the detection value of the detection unit.

The output calibration unit 33 may associate the output values of a plurality of detection units of each system in each of the torque sensors 26, 27, 28 with the output values of the moment output unit 31 and output a torque value having been calibrated, modified, and corrected from the output values of the detection unit in each of the torque sensors 26, 27, 28.

Further, the output calibration unit 33 may associate the output value of each of the detection units of a plurality of systems in each of the torque sensors 26, 27, 28 with the output values of the moment output unit 31 and output a torque value having been calibrated, modified, and corrected from the output values of the detection unit. It is thereby possible to calculate a torque value with accuracy in each of the torque sensors 26, 27, 28.

At the time of the output calibration unit 33 calculating the torque acting on each of the torque sensors 26, 27, 28 from the torque detection value or the output value of the detection unit, any other method may be employed so long as being a method in which the calibration can be performed associating the output value of the detection unit in each of the torque sensors 26,27,28 with the torque, such as conversion by table, multiplication of a calibration matrix, or linear or nonlinear conversion by function.

The above embodiment is guided from each aspect of the present disclosure below.

An aspect of the present disclosure is directed to an industrial robot system including: a robot that includes a torque sensor on at least one rotary shaft; and a controller that controls the robot. The controller includes a moment output unit that outputs a value of moment from a posture of the robot or the posture and a motion of the robot, a program storage unit that stores a motion program, a drive control unit that causes each of component parts of the robot to perform a rotating motion around the rotary shaft in accordance with the motion program stored in the program storage unit, and an output calibration unit that associates a torque detection value detected by the torque sensor with the value of moment output from the moment output unit in the rotating motion of each of the component parts around the rotary shaft performed by the drive control unit.

According to the present aspect, when the drive control unit causes the component parts to perform the rotating motion around at least one rotary shaft based on the motion program stored in the program storage unit, the torque value detected by the torque sensor changes in accordance with the rotating motion. The value of moment of each of the component parts around the rotary shaft can be accurately calculated for each rotation angle from the mass and dimensions of the mechanical portion in the robot.

Therefore, by the output calibration unit associating the torque value detected by the torque sensor in the rotating motion with the value of moment output by the moment output unit from the posture of the robot, or the posture and the motion of the robot, it is possible to generate an accurately calibrated output characteristic, that is, the relationship of the value of moment with respect to the torque value detected by the torque sensor. Thereby, even if distortion occurs in the torque sensor during the assembly of the torque sensor into the robot, or even if the torque sensor has a strong nonlinear characteristic, the torque sensor can be calculated with high accuracy in a short time.

In the above aspect, the moment output unit may have association data between the posture of the robot and the value of moment.

Further, in the above aspect, the moment output unit may calculate the value of moment acting on the torque sensor, from the posture of the robot or the posture and the motion of the robot and information of each of the component parts of the robot or each of the component parts and an attached part of the robot, and the output calibration unit may associate the calculated value of moment with the torque detection value detected by the torque sensor.

Further, in the above aspect, the drive control unit may perform contact determination for the robot based on the value of moment associated by the output calibration unit with the torque detection value detected by the torque sensor.

With this configuration, when the moment or force due to the action of the external force calculated from the torque detection value detected by the torque sensor exceeds a predetermined threshold while the robot is moved to conduct work, it is accurately determined that the interference between the robot and the surrounding object has occurred, thus enabling performance of a predetermined motion as follows: the robot is stopped correctly, decelerated and stopped, returned to the direction of the previous motion, or escaped by being moved in the direction in which the force has acted, or a previously prepared motion program is executed.

Further, in the above aspect, the drive control unit may control an assist torque at a time of performing an inductive operation by directly holding the component parts of the robot, based on the value of moment associated by the output calibration unit with the torque detection value detected by the torque sensor.

Further, in the above aspect, the component parts may be parts of a mechanical portion in the robot, the parts being caused to move around the rotary shaft.

With this configuration, the torque sensor can be accurately calibrated in a state where a part such as a tool is not mounted in the mechanical portion of the robot.

Further, in the above aspect, the component parts may include a part to be mounted in the mechanical portion of the robot.

With this configuration, the torque sensor can be accurately calibrated in a state where a part such as a tool is mounted in the mechanical portion of the robot.

The above description is only an example, and the present invention is not limited by the embodiment and modification described above so long as the features of the present invention are not impaired. The constituent elements of the above embodiment and modification include those replaceable and obviously replaced while the identity of the invention is maintained. That is, for other forms conceivable within the scope of the technical idea of the present invention is included within the scope of the present invention.

The invention claimed is:

1. An industrial robot system comprising:
   a robot that includes a torque sensor on at least one rotary shaft; and
   a controller that controls the robot, the controller comprising:
      a moment output unit that outputs a value of moment of force generated by an inertia force due to a mass of each component part resulting from a movement of the robot or a gravity applied thereto around the at least one rotary shaft,
      a program storage unit that stores a motion program,
      a drive control unit that causes each component part of the robot to perform a rotating motion around the at least one rotary shaft in accordance with the motion program stored in the program storage unit, and
      an output calibration unit that generates, prior to execution of the motion program, an output characteristic of the torque sensor in which a torque detection value detected by the torque sensor with the value of moment output from the moment output unit in the rotating motion of each component part of the robot around the at least one rotary shaft performed by the drive control unit are associated with each other, and that outputs the generated output characteristic to the drive control unit.

2. The industrial robot system according to claim 1, wherein the moment output unit has association data between the posture of the robot and the value of moment.

3. The industrial robot system according to claim 1, wherein the moment output unit calculates the value of moment acting on the torque sensor, generated due to the mass of each component part of the robot and the gravity applied thereto around the at least one rotary shaft, and the output calibration unit associates the calculated value of moment with the torque detection value detected by the torque sensor.

4. The industrial robot system according to claim 1, wherein the drive control unit performs contact determination for the robot based on the value of moment associated by the output calibration unit with the torque detection value detected by the torque sensor.

5. The industrial robot system according to claim 1, wherein the drive control unit controls an assist torque at a time of performing an inductive operation by directly holding the component parts of the robot, based on the value of moment associated by the output calibration unit with the torque detection value detected by the torque sensor.

6. The industrial robot system according to claim 1, wherein the component parts are parts of a mechanical portion in the robot, the parts being caused to move around the at least one rotary shaft.

7. The industrial robot system according to claim 6, wherein the component parts include a part to be mounted in the mechanical portion of the robot.

8. The industrial robot system according to claim 1, wherein the torque sensor comprises
   torque detection units of two or more systems that detect torques acting on the torque sensor, and the output calibration unit associates each of the torque detection values detected by the torque detection units with the value of moment.

9. An industrial robot system comprising:
   a robot that includes a torque sensor on at least one rotary shaft; and
   a controller that controls the robot, wherein the controller comprises:
      a moment output unit that outputs a value of moment of force generated by an inertia force due to a mass of each component part resulting from a movement of the robot or a gravity applied thereto around the at least one rotary shaft,
      a program storage unit that stores a motion program,
      a drive control unit that causes each component part of the robot to perform a rotating motion around the at least one rotary shaft in accordance with the motion program stored in the program storage unit, and
      an output calibration unit that generates, prior to execution of the motion program, an output characteristic of the torque sensor in which a detection value detected using a physical quantity related to a torque with the value of moment output from the moment output unit in the rotating motion of each component part of the robot around the at least one rotary shaft performed by the drive control unit are associated with each other, and that outputs the generated output characteristic to the drive control unit.

10. The industrial robot system according to claim 9, wherein the torque sensor comprises
   a detection unit that detects the physical quantity related to a torque of each of two or more systems, each system detecting a torque acting on the at least one rotary shaft, and detects the detection value from the physical quantity, and the output calibration unit associates each of the detection values with the value of moment.

* * * * *